United States Patent [19]

McLeod et al.

[11] Patent Number: 4,867,613

[45] Date of Patent: Sep. 19, 1989

[54] TREATMENT OF INORGANIC PARTICLES WITH POLYMER

[75] Inventors: Gloria McLeod; Nicholas D. Smith, both of West Yorkshire, England

[73] Assignee: Allied Colloids, Ltd., England

[21] Appl. No.: 119,803

[22] Filed: Nov. 12, 1987

[30] Foreign Application Priority Data

Nov. 13, 1986 [GB] United Kingdom ............... 8627175

[51] Int. Cl.$^4$ .......................... E02B 3/00; E02D 3/12
[52] U.S. Cl. .................................... 405/263; 166/195; 405/264
[58] Field of Search ............... 405/263, 264; 523/130, 523/132; 166/295, 294; 106/900; 427/136

[56] References Cited

U.S. PATENT DOCUMENTS

| 3,520,140 | 7/1970 | Katzer | 405/264 |
|---|---|---|---|
| 3,520,141 | 7/1970 | Routson | 405/264 |
| 4,366,194 | 12/1982 | Pilny et al. | 166/295 X |
| 4,391,925 | 7/1983 | Mintz et al. | 166/295 X |
| 4,474,903 | 10/1984 | Robertson et al. | 166/295 X |
| 4,607,066 | 8/1986 | Barry et al. | 166/295 X |
| 4,637,759 | 1/1987 | Owa et al. | 405/263 X |
| 4,669,920 | 6/1987 | Dymond | 405/263 X |
| 4,690,589 | 1/1987 | Owa | 405/263 |
| 4,712,617 | 12/1987 | Kocsis | 166/295 X |

FOREIGN PATENT DOCUMENTS

| 538986 | 9/1984 | Australia . |
| 2912326 | 2/1980 | Fed. Rep. of Germany . |
| 994773 | 2/1983 | U.S.S.R. . |
| 1105662 | 7/1984 | U.S.S.R. . |
| 1180532 | 9/1985 | U.S.S.R. . |

*Primary Examiner*—Dennis L. Taylor
*Attorney, Agent, or Firm*—Ostrolenk, Faber, Gerb & Soffen

[57] ABSTRACT

Dirt tracks and other surfaces formed of particulate material are stabilized, to suppress dust formation, by incorporating an aqueous solution of a water soluble, low molecular weight, anionic polymer.

8 Claims, No Drawings

TREATMENT OF INORGANIC PARTICLES WITH POLYMER

The present invention relates to a method for stabilising surfaces formed of inorganic particulate material so as to provide dust suppression, for example on dirt tracks and on stacks of mining tailings and other exposed surfaces.

Wetting the particulate material with water will suppress dust formation temporarily, but frequent rewetting is required in hot climates and so may be impracticable. It is known to apply polymers and other materials to give longer lasting surface stabilization.

In U.S. Pat. No. 3,677,014, water-swellable polyacrylamide, that may have been partially hydrolysed, is used to stabilise the exposed surface of soil or piles of fine inorganic particles. The polymer has a molecular weight between 100,000 and about 4 million, usually between 1 million and 3 million. Polyacrylamide is shown to work better than polyacrylic acid, presumably of approximately the same weight. The polymer is best applied from solution but the solution is liable to be viscous and so can be difficult to handle and apply effectively. The polymers are relatively expensive so that their use is often uneconomic. When a surface treated with the polymer is wet (either during initial application or as a result of rewetting) the surface may become sticky or slippery. The treatment is therefore likely to result in properties that are unsatisfactory or even dangerous in practice.

In DE 2912326, water-soluble polyelectrolytes are used to aid dust suppression by wetting with water. The polymers may be anionic or cationic and may often be acrylic polymers e.g., formed from acrylamide or derivatives or acrylic acid prefereably have molecular weights of 100,000 up to 10 million, preferably about 1 million. Similar problems may therefore again occur. Anionic polymers (e.g., 70:30 acrylamide:acrylic acid copolymers) are shown to be less satisfactory than cationic polymer (e.g., 75:25 acrylamide:dimethylaminoethyl methacrylate).

It is also known to use water insoluble polymers.

In U.S. Pat. No. 4,417,992, water-swellable crosslinked polyacrylamide gel particles are applied from a dispersion in oil to roads, mines and mineral piles to bind dust particles. The polyacrylamide is optionally formed by copolymerising e.g., acrylic acid. Such dispersions are very expensive and their application releases undesirable organic solvent into the environment. Stickiness may again be a problem.

Other examples of using acrylate binders are for instance described in Chem. Abs. 104: 135355, 102: 83483, 84: 165593 and 89: 64157. The use of other binders is described in Chem. Abs. 104: 55604, 102: 190270, 80: 50298 and 75: 110867. These binders all tend to suffer from the same problems of handling, application, stickiness and cost as those discussed above.

It is known to apply coating compositions of other polymer binders to dusty surfaces, to form a film over the surface and suppress dust removal. For example bitumen is a well known dust suppressant, eg see *Chem Abs* 100 108447. Synthetic high molecular weight polymer based coating compositions have also been used; for example in *Chem Abs* 102 190270 (SU 1142645) a film of urea-formaldehyde resin suppresses dust and in *Chem Abs* 85 64223 a film of poly(vinylacetate) is used to control dust. Such resinous coating compositions are viscous and so are very difficult to handle and, at the concentrations at which they need to be applied, are often uneconomic.

Many dust-suppressing compositions contain surfactants. The surfactant is often included in polymer-containing compositions for the purpose of improving stability or other bulk properties of the composition.

For example in U.S. Pat. No. 4,551,261 the sodium salt of an alkyl ether sulphate and a coconut oil alkanolamide are used as foaming agents for a modified butadiene-styrene latex composition for dust-suppression on moving coal. In JP 73-71383 a sorbitan monostearate was used with an ethylene-vinylacetate copolymer in aqueous solution as an antidusting composition for coal and ores. In U.S. Pat. No. 4,369,121 an aqueous solution containing a cellulose ether and a wetting agent is applied to stockpiles of aggregate materials to control dust release. In SU 994773 polyethylene glycol mono(-di-t-butylphenyl)ether and carboxy methyl cellulose in aqueous solution are used to suppress dust.

Aqueous solutions of surfactants are also known to be able, in the absence of polymeric binder, to improve dust-suppression by improving wetting of the particulate material. This leads to improved penetration, which, in turn, leads to improved temporary binding of the particulate material and decreased rates of evaporation. A problem with reliance on surfactants alone, in the absence of polymeric binder, is that they tend to have only a limited period of action and to give little or no dust suppression effect after drying.

In *Chem Abs* 100 108447, lignosulphonates are used to control mining hand road dust. In AU 538986 a highly concentrated aqueous solution of a fatty acid and a polyglcol is applied to a mineral stockpile to control dust escape. In SU 1180532, ethanol and Syntanol DSLO are added to water used to suppress dust formation in a coal seam.

In *Chem Abs* 97 75250, a series of ethoxylated nonionic surfactants are tested for their rates of wetting of coal dust. In GB 2079772, an aqueous solution of polyethylene oxide of molecular weight $10^6$ was used as a coal-dust suppressant. In SU 1105662, an aqueous solution of polyethylene glycol having molecular weight in the range 200–5000 is used suppress dust.

At present therefore dust suppression systems tend to be relatively ineffective after drying or, if they rely upon the presence of a pollymeric binder, they tend to incur difficulties in application and may give stickiness and/or other properties rendering them undesirable for use on, for instance, dirt tracks.

We have now surprisingly found that low molecular weight anionic polymer can be used as a very satisfactory dust suppressant.

According to the invention, a surface formed of inorganic particulate material is stabilised by incorporating an aqueous solution of polymer into the surface and is characterised in that the polymer is formed of water soluble monomer or monomer blend of 50 to 100% by weight anionic water-soluble monomer and 50 to 0% by weight non-ionic comonomer, and has a molecular weight of below 70,000.

We have found that the anionic polymers used in the process of the invention give results that are suprisingly superior to those obtained with cationic polymers. The results contrast those described in DE 2912426 where, for higher molecular weight polymers, cationics are superior to anionics in dust suppression. The polymers used in the present invention are also far superior to poly(alkylenoxy) compounds which have been proposed in the prior art.

In contrast to the polymeric binders used in the prior art, the polymers used in the invention must be anionic, water soluble and of low molecular weight. They will have a molecular weight that is generally of a value typical for the molecular weight of anionic polymeric dispersants. Thus the molecular weight is the generally below 50,000 and most usually is below 20,000 and preferably below 10,000. It is generally above 500, usually above 1,000 and preferably above 1,500 or 2,000. Values in the range 1,000 or 1,500 up to 5,000 are often preferred.

Since the polymers are of low molecular weight, the handling and stickiness problems of the prior art are reduced or avoided.

The polymers used in the method are formed from at least about 50% by weight water-soluble ethylenically unsaturated anionic monomer, generally at least 70% by weight and sometimes more than 90 or 95% by weight anionic monomer. Homopolymers are preferred.

Ethylenically unsaturated monomers that may be used are for example carboxylic, sulphuric, sulphonic or phosphoric acid ethylenically unsaturated monomers, generally suplphonic or carboxylic acid monomers or derivatives. Acrylic monomers are preferred. Examples of carboxylic acids are maleic, itaconic, crotonic, more preferably acrylic and methacrylic acid. Sulphonic acids that may be used are for example acrylamido-alkyl sulphonic acids such as 2-acrylamido-2-methyl propane sulphonic acid, or allyl sulphonates. The units derived from the anionic monomers are generally present in the form of a water soluble metal, amine or ammonium salt, preferably an alkali metal salt, more preferably the sodium salt.

The non-ionic comonomer may be soluble or insoluble in water, as long as the blend with the anionic monomer is water soluble. The monomer may be a vinyl or allyl monomer that is copolymerisable with the anionic monomer, but is generally an acrylic monomer. It may be for instance a hydroxyalkyl- or lower alkyl-(meth)acrylic ester (such as butyl acrylate or 2-ethyl-hexyl acrylate) an N-alkyl substituted (meth) acrylamide, methacrylamide or, most preferably, acrylamide.

The preferred polymer is sodium polyacrylate generally having a molecular weight of, from 1000 to 10,000, preferably 1500 to 5000.

The polymer may be made by any conventional polymerisation technique to the desired molecular weight. The most convenient method is by aqueous solution polymerisation. The polymerisation mixture contains conventional components such as initiators, chain transfer reagents, etc.

Although the polymer can be supplied to the user in any convenient form, it is generally supplied in the form of a concentrated aqueous solution, for example at a concentration of 30% by weight or more. The concentrate may be diluted before being supplied to the application apparatus or may be diluted in line within the apparatus by feeding water and concentrated polymer solution to the outlet simultaneously. The concentration of polymer in the final solution is applied to the inorganic particulate material is usually in the range of 0.1–10% by weight, preferably in the range 0.2–5% and more preferably in the range 0.5–2%.

The incorporation of the aqueous solution of the polymer into the surface of particulate material can be achieved by wetting dry particulate material that contains the polymer homogeneously distributed throughout. The wetting must be with sufficient water to form the desired solution of polymer throughout the particulate material at the surface. Initially however the incorporation is generally by application of a solution of the polymeric material into the surface of inorganic particulate material by any suitable means. For instance the solution may be painted or poured on to the surface but is generally sprayed. The polymer is generally applied to the surface at a rate of 5–100 g dry polymer/m$^2$.

Instead of applying the solution to the preformed surface, the polymer may be incorporated into bulk particulate material that is subsequently formed into the surface. Thus particulate material that is to be spread on the ground or to be built up into a heap may be mixed with the polymer, for instance as it travels along the conveyor. In particular, the particulate material being carried along a conveyor may be sprayed or otherwise treated with aqueous polymer solution, so as to provide dust suppression on the conveyor, and may then be spread on the ground or built into a heap, so as to give dust suppression in the surface.

The invention is useful for dust suppression on a wide range of surfaces of particulate material. The particulate material may be transported, e.g., by conveyor or truck, or may be static. The dust suppression effect of the invention may deteriorate if the material is subjected to prolonged vibration, as occurs during transportation by road or rail, and so the process is of most benefit when used to suppress dust on static particulate material. For instance the material may be the surface of the ground, a layer spread on the ground, or a spoil tip or other heap. The invention is especially valuable when applied to the dust suppression of dirt roads and other dirt tracks. The particulate material can be the soil, sandy soil or other particulate surface of road or ground or it may be a heap or layer of mining tailings or slag or ore. For instance it may be of coal, iron or other metal ore, china clay or other clay, cement or lime.

In order to maintain the dust suppression properties of the surface of particulate material it may be necessary to repeat the incorporation of the aqueous solution of polymeric material. For instance a track or other path or road of sandy soil or other inorganic particulate material may be sprayed or otherwise wetted with one or more applications of the aqueous polymer solution, optionally with the surface being dried in between each application, and when dust suppression properties begging to deteriorate they can be restored either by spraying or other application of further aqueous solution or merely by wetting with water, since the water will dissolve the dried polymeric material that is within the surface.

The following examples illustrate the invention.

EXAMPLE 1

The dust suppression action of various dust suppressants was evaluated by the following test procedure:

A large piece of coal was cut and polished to form a block with a flat uniform surface. A further sample of coal was crushed and the 0.25 to 2 mm fraction was separated for use as the "dust".

Two drops of the dust suppressant under test were placed on the polished coal sample and then sprinkled with the dust, the excess dust was then tipped off.

The polished block was then placed in a wind tunnel and subjected to a wind velocity of 50–60 mph for 6 minutes. The time taken for the dust to be blown off the block was noted if dust loss was apparent.

The block was re-polished between tests to remove any residual dust suppressant from the previous test.

The dust suppressants were:

A. A homopolymer of sodium acrylate having molecular weight of about 3,000.
B. A commercially available latex emulsion-type dust suppressant.
C. A commercially available dust suppressant comprising an emulsion of heavy oils and tars.
D. A commercially available dust suppressant comprising insoluble, cross linked polyacrylamide polymer according to U.S. Pat. No. 4,417,992.
E. A polyethylene glycol having an average molecular weight of 4000.
F. A polyethylene glycol having an average molecular weight of 8000.

| Product | Dust Suppressant Solution Concentration (%) | | |
|---|---|---|---|
| | 0.5 | 1.0 | 2.0 |
| A | 4'35" | 6'00" i | 6'00" i |
| B | 6'00" ½ | 6'00" ½ | 6'00" p |
| C | 4'03" | 4'36" | 4'38" |
| D | 6'00" p | 6'00" i | 6'00" i |
| E | 3'06" | 6'00" p | 6'00" i |
| F | 5'54" | 6'00" p | 6'00" i | water = 1'45"
i = intact
p = partial dust loss
½ = approximately ½ dust lost

None of the products gave satisfactory dust control at 0.5% solution concentration and only the product of the invention (A) and product D gave complete dust control at 1.0 and 2.0% solution concentration. However product D was difficult to apply and tended to give a rather sticky texture to the surface, whereas the surface treated with product A was non-sticky.

EXAMPLE 2

Dust emission was a serious problem at a Canadian coal mine from mine roadways, lagoon embankments and tip areas.

Product A was supplied at 1% concentration in water and was sprayed by road tanker spray on to the areas to be treated. Application was repeated when necessary. Even when the surfaces were very dry, dust emission was greaty reduced.

We claim:

1. A process for stabilizing a surface formed of inorganic particulate material comprising providing an aqueous polymer solution consisting essentially of water and a water soluble anionic polymeric dispersant material that has a molecular weight of from 1,000 to 20,000 and that is formed from water soluble ethylenically unsaturated monomeric material or a water soluble blend of at least 50% ethylenically unsaturated anionic monomeric material with up to 50% ethylenically unsaturated non-ionic material, and stabilizing the surface by incorporating into the surface aqueous stabilizing material that consists essentially of the said aqueous polymer solution.

2. A process according to claim 1 in which the surface into which the aqueous stabilizing material has been incorporated is dried and subsequent stabilization of the surface is achieved by wetting the dried surface with water.

3. A process according to claim 1 in which the polymer has a molecular weight of 1,000 to 5,000.

4. A process according to claim 1 in which the polymer is formed from 50 to 100% by weight acrylic acid or water soluble salt thereof and 0 to 50% by weight lower alkyl acrylate or acrylamide.

5. A process according to claim 1 in which the polymer is sodium polyacrylate having a molecular weight of 1,500 to 10,000.

6. A process according to claim 1 in which the surface is static.

7. A process according to claim 6 in which the surface is a dirt track.

8. A process according to claim 1 in which the aqueous solution of polymeric material is incorporated into the surface by spraying the surface with the solution.

* * * * *